United States Patent [19]

Frumoff

[11] 4,053,593

[45] Oct. 11, 1977

[54] MEDICAL PRODUCT COMBINING ANTIMICROBIAL, ANTIPORASITIC AND VITAMIN COMPLEX

[76] Inventor: Lew Frumoff, D-145 Monaco Way, Delray Beach, Fla. 33446

[21] Appl. No.: 635,610

[22] Filed: Nov. 26, 1975

[51] Int. Cl.² ............... A61K 31/71; A61K 31/68; A61K 31/345
[52] U.S. Cl. .................... 424/181; 424/201; 424/227; 424/247; 424/251; 424/252; 424/255; 424/263; 424/272; 424/273 R; 424/285; 424/324; 424/329
[58] Field of Search ............... 424/227, 236, 237, 271, 424/285, 201, 251, 252, 263, 255, 273, 272, 181, 324, 247, 329

[56] References Cited
PUBLICATIONS

The Merck Veterinary Manual – Fourth Edit., 1973, pp. 1172–1173.
Janecek — Chem. Abst., vol. 63 (1965) p. 17048c.
Mann — Chem. Abst., vol. 74 (1971) p. 73523k.

*Primary Examiner*—Sam Rosen
*Attorney, Agent, or Firm*—Samson Helfgott

[57] ABSTRACT

An improved medical product which can be used in preventing and curing diseases, especially in fish. The medical product includes an antimicrobial agent, a chemically compatible antiparasitic agent and a chemically compatible vitamin complex. In one embodiment of the invention, the antimicrobial agent includes a nitrofuran complex containing nitrofurantoin and furazolidone; the antiparasitic agent includes metronidazole, and the vitamin complex includes folic acid, riboflavin, pyridoxine HCl, cyanocobalamin, and thiamin mononitrate.

12 Claims, No Drawings

MEDICAL PRODUCT COMBINING ANTIMICROBIAL, ANTIPORASITIC AND VITAMIN COMPLEX

BACKGROUND OF THE INVENTION

1. Field of the Invention

This invention relates to pharmaceuticals and more particularly to a medical product which can prevent and cure diseases, especially in fish.

2. Description of the Prior Art

Infectious diseases have been studied by many individuals to determine their causes as well as appropriate cures and proper prophylactic drugs to prevent disease occurrence. Some diseases are caused by bacteria, some by viral infection and others are caused by parasites. It has been found that fish are especially susceptible to infectious diseases. Because of their limited homeostatic mechanisms and their continuously changing environment; causing adverse excessive biological stress, the fish are extremely sensitive to diseases. Included in the group of infectious diseases caused by bacterial agents are such well known fish diseases as ulcer diseases, dropsy, red and spot pests, mouth fungus, furunculosis, assorted gill diseases, columnaris, fin and tail rot, as well as general malaise. However, fish are also extremely susceptible to such interanl and external parasites as fungi and protozoans. The disease ichthyophonus is cause by a fungi. Numerous parasites which usually inhabit the intestinal tract of the fish and remain as harmless, low or severe grade pathogens, can also cause physiologic disorders in the fish under certain conditions.

In addition to specific diseases, the environmental changes effecting fish such as vitamin deficiencies, overcrowding, temperature changes, fluctuations in the water chemistry, ect., can cause considerable biological stress on the fish and can reduce their defense systems whereby they will be susceptible to disorders caused by bacteria existing in the environment as well as parasites, normally harmless which are contained either directly in the fish or in their environment.

Numerous studies have been carried out to test various antimicrobial agents against infectious diseases caused by bacterial or viral causes. Similarly, many studies have indicated types of antiparasitic drugs to be utilized against the fungi and protozoans which may affect the condition of the fish. These drugs have provided some limited cure rate, but their effectiveness has not been very great. Also, it was generally necessary to continue usage of these drugs over long periods of time, such as approximately 20 days, in order to obtain any results at all. However, such continued use of the drug has had a tendancy of increasing the resistance of the bacterial strains against these drugs whereby their effectiveness is reduced with continued usage.

One of the reasons for the limited success in the prior art medicines is that they have failed to recognize that fish diseases do not occur as a single caused event but is rather the end result of interactions between the fish, the environment and the etiologic agent causing the illness. Thus, while the immediate cause of an illness may be a particular bacterial agent, numerous other bacteria regularly contained in the environment may induce secondary illness in the fish, or may combine with primary bacteria to cause a complex illness. Furthermore, the existing parasites will also effect the fish during such conditions to compound the illness and increase the disorders affecting the fish. In addition, the fish are very sensitive to environmental fluctuations and such changes in nutrition, temperature, water chemistry, number of fish, etc., can produce considerable stress on the fish so that normal parasites or bacteria present in the environment will now exceed the fishs' ability to defend itself against such etiologic agents and the fish will deteriorate under various disorders.

As a result of these complex interactions between the fish, its environment, the various bacterial, viral, and parasitic elements, it is not sufficient to utilize a single antibacterial or antiparasitic agent alone, or in sequence. Furthermore, merely attacking the specific bacteria or parasite suspected, is also insufficient to providing a total cure since the environmental stress on the fish must also be relieved in order to permit the fish to build up its resistance against the attacking agent.

It is therefore necessary to form a combination of medicinal ingredients which can specifically attack the numerous etiologic agents and simultaneously counteract the environmental stress placed upon the fish.

SUMMARY OF THE INVENTION

It is therefore an object of the present invention to provide an improved medical product which avoids the aforementioned problems of prior art medicines.

A further object of the present invention is to provide a medical product for use in preventing and curing diseases, especially in fish.

Yet another object of the present invention is to provide a medical product which can attack the etiologic agent causing a disorder in the fish, and simultaneously counteract the environmental stress placed upon the fish.

Another object of the present invention is to provide a medical product which can be utilized by individual fish owners as well as by industrial users, such as fisheries, wholesalers and store owners.

Still a further object of the present invention is to provide a medical product which has broad spectrum antimicrobial action plus broad spectrum antiparasitic action, for producing a broad attack over a wide range of illness.

Still another object of the present invention is to provide a medical product including a vitamin supplement for aiding in the removal of adverse environmental stresses.

A further object of the present invention is to provide a medical product against fish disease, which can be used either as a prophylaxis or as a cure of such diseases.

Still another object of the present invention is to provide a medical product which can be used when no specific pathogen has been indicated, or when no diagnosis is feasible, and yet will counteract and attack such pathogens.

A further object of the present invention is to provide a medical product for fish which provides little to no discoloration of the water in the fish tank.

Still a further object of the present invention is to provide a medical product which can be used with all species of fish.

A further object of the present invention is to provide a medical product for use in preventing and curing fish diseases and which is compatible with salt, thereby permitting salt to be added to the tank water as needed.

Yet a further object of the present invention is to provide a medical product for use in preventing and curing disease in fish and which can be used both for marine and freshwater aquarium type fish.

Still another object of the present invention is to provide a medical product for use in preventing and curing diseases in fish, wherein there is no need to raise the temperature of the tank water when using such product.

Another object of the present invention is to provide a medical product for use in preventing and curing disease in fish, which does not produce adverse effects or drug resistant bacterial strains even when administered in high overdoses.

Still another object of the present invention is to provide a medical product for fish which can be administered orally in a tank, pond or vat bath or injected as an intraperitoneal injection.

Still a further object of the present invention is to provide a medical product for fish which can bring about beneficial results after a single treatment.

Yet a further object of the present invention is to provide a medical product which contains a vitamin complex, including specific vitamins which reduces environmental stress on fish.

Yet another object of the present invention is to provide a medical product for fish which is easy for use in fish tanks and does not require the removal of carbon filters, does not require any increase in aeration, and permits continued use of regular filtration.

These and other objects, features and advantages of the invention will, in part, be pointed out with particularity and will, in part, become obvious from the following description of the invention.

Briefly, the invention describes a medical product for use in preventing and curing diseases, especially in fish, and which comprises at least one antimicrobial agent, a chemically compatible antiparasitic agent, and a chemically compatible vitamin complex. In one embodiment of the invention, the antimicborial agent includes a complex of nitrofurans including nitrofurantoin and furazolidone; the antiparasitic agent is metrondazole, and the vitamin complex includes folic acid, riboflavin, pyridoxine HCl, cyanocobalamin, and thiamin mononitrate.

DESCRIPTION OF THE PREFERRED EMBODIMENT

It has been found that fish diseases do not occur as the result of a single event or a single cause. Rather, it is the result of interactions of various etiologic agents, together with the particular type of fish, and the environment in which the fish exists, that act concurrently to produce disorders in the fish. For example, bacteria are frequently found in the water. Although they are continuously present, unless the environmental quality and the host defense of the fish deteriorate, such bacteria will not cause any disorders in the fish. At the same time, parasites may exist both in the environment as well as in the fish themselves, but are generally harmless because of the inherent defenses of the fish. However, when affected by bacterial or viral organisms and with a deterioration of the environment, such parasites may cause fish disorders either alone or in combination with bacterial or viral infections.

It has been found that in order to achieve high rates of cure, it is necessary to combine in a single product an antimicrobial agent with a chemically compatible antiparasitic agent, and in addition, to include a chemically compatible vitamin complex. It is the combination of the three items together which provide synergistic results which gives cure rates of extraordinary high percentage and within extremely fast time periods. Such extraordinary rates of cure, and the speed with which such cures occur, are completely unexpected and unobvious in view of the heretofore known cure rates associated with each of the agents taken individually. For example, when a bacterial infection is diagnosed, and an antibacterial agent alone is administered, the average cure rate has been approximately 50% to 70% and required a minimal period of 10 days before appreciable results could be observed. If, in addition to the bacterial infections there existed a parasite affecting the fish, the curative rates using an antibacterial agent alone were lower than 40%. However, using the combination of agents, in accordance with the present invention, the curvature rate has been found to be as high as 95%, and higher, and excellent results were observed in as short a time span as approximately 3 days. Such superior results have not been heretofore obtained even when various antibacterial agents have been combined. Furthermore, even when two of the three presently identified agents are utilized, the results are still rather low. For example, combining just an antibacterial agent and an antiparasitic agent, does not produce anywhere near the dramatic results obtained by the combination of all three agents in accordance with the present invention. Also, combining the vitamin complex with either an antibacterial agent alone, or with an antiparasitic agent alone, similarly does not bring about very good results. It is only when all three are combined together that such unusual and dramatic curative rates can be achieved in such extremely short time spans.

In the present invention, numerous antibacterial agents have been tried and tested in combination with an antiparasitic agent and a specific vitamin complex. Various nitrofurans have been used as the antimicrobial agent, and have been tested in combination with a chemically compatible antiparasitic agent and a chemically compatible vitamin complex. Nitrofurans tested include nitrofurantoin and furazolidone in a complex arrangement applied orally and the combination of nitrofurantoin sodium, injected and furazolidone applied orally. Also antibacterial agents from the aminoglycoside group have been tested in combination with an antiparasitic agent and a vitamin complex. For example, both gentamicin sulfate as well as kanamycin sulfate have been tried. Also, the antibiotics from the tetracycline group have been tried and tested together with an antiparasitic agent and a vitamin complex. Such antibiotics include oxytetracycline (Terramycin), chlorteracycline (Aureomycin) and tetracycline HCl. Metabolic antimicrobial agents were also tested such as streptomycin. Other agents were also tested as well as combinations of the aforementioned.

Furthermore, other type of synthetic antibiotic agents have also been tested including chloramphenicol (Chloromycetin) as well as chloramphenicol sodium succinate.

Numerous other antimicrobial agents have also been tried and tested and have been found effective when combined with a chemically compatible antiparasitic agent and a chemically compatible vitamin complex.

The antimicrobial agent may in fact include a complex of such agents combined together. Furthermore, it may include antimicrobial agents which are specifically antibacterial. For example, the specific antibacterial agent may be nitrofurantoin while the broad antimicrobial agent may be furazolidone. Both of these are nitrofuran drugs and together form the antimicrobial agent complex.

In the case of the antiparasitic agent, various such agents have been tested, including well known methylene blue, malachitegreen, acriflavine and metronidazole.

In the case of the vitamin complex, it has been found that the vitamin complex is especially useful in reducing the environmental stress and thereby permitting the fish to rebuild its own defenses against the bacterial and/or viral agent. Although there are many types of vitamins well known in the art, after numerous tests, is has been found that only a select number of such vitamins are in fact useful in connection with reducing the stress in the fish and other vitamins not only find no beneficial purpose in aiding the fish, but in many cases may in fact harm such fish. The particular vitamins which have been found to be useful in removing the environmental stress upon the fish, when taken in combination with an antimicrobial agent and an antiparasitic agent, are the following: folic acid, riboflavin, pyridoxine HCl, cyanocobalamin, and thiamin mononitrate.

As was heretofore mentioned, numerous combinations of antimicrobial agents, antiparasitic agents and a vitamin complex have been tested and, it has been generally found that all combinations of such three agents produced dramatically improved curative rates within short periods of time. However, the preferred combination of such drugs which have produced the best curative rate in the shortest periods of time and which has been found most effective is as follows:

| AGENT | INGREDIENT | % by weight | weight per 10 gallon tank |
|---|---|---|---|
| antimicrobial | nitrofurantoin | 6.1% | 25mg |
|  | furazolidone | 12.2% | 50mg |
| antiparasitic | metronidazole | 60.9% | 250mg |
| vitamin complex | folic acid | 0.12% | 0.5mg |
|  | riboflavin | 2.44% | 10mg |
|  | pyridoxine HCl | 12.18% | 50mg |
|  | cyanocobalamin | 0.006% | 25mcg |
|  | thiamin mononitrate | 6.09% | 25mg |

The above product will hereinafter be referred to as the preferred product and the particular vitamins used will be hereinafter referred to as the preferred vitamin complex.

Each of the foregoing have been utilized, individually in connection with various disorders. However, when used individually there has only been provided a rather low curative rate and there was needed long periods of time in order to obtain any appreciable results. It is only when combined in the aforementioned manner that synergistic results occur and the dramatic curative rates are obtained.

Nitrofurantoin is a chemical composition of the ingredients: 1 - [(5-nitro-2-furanyl) methylene) amino] or $C_8H_6N_4O_5$. It is a synthetic nitrofuran antibacterial agent which is usually provided as stable, lemon-yellow odorless crystals or fine powder. It is very slightly soluble in water. It has been utilized as an effective antibacterial agent against a majority of pathogens including certain strains of *E. coli*, Klebsiella, *Proteus, sp.*, Pseudomonas, *Aerobacter sp.*, staphylococci, streptococci, pneumococci, clostridia and *B. subtilis*. However, when utilized above its curative rate has been approximately 40% and it required a minimum of 10 days before appreciable results were observed. Nitrofurantoin is available under the brand name Furadantin produced by Eaton Laboratories.

Furazolidone is a chemical composition of the ingredients 3-(5-Nitrofurfurylideneamino)-2-oxazolidinone. It is a synthetic antibacterial nitrofuran which is generally provided as a stable, yellow crystalline compound. It has heretofore been utilized against a broad spectrum of bacterial agents including staphylococci, Salmonella, Shigella, Proteus, Aeroabcter aerogenes, E. coli, Vibrio cholerae, and Giardia lamblia. Furazolidone is available under the brand name Furoxone from Eaton Laboratories.

Metronidazole is a chemical composition of the ingredients 2-methyl-5-nitroimidazole-1-ethanol or $C_6H_9N_3O_3$. It is generally provided as crystals or a crystalline powder which is odorless and is of a color between white and pale yellow. It is generally stable in air but darkens to exposure to light. It is sparingly soluble in water. It has been used as an effective trichomonacide and amebacidal agent and has been indicated in the treatment of both acute intestinal amebiasis and amebic liver abscess. Metronidazole is available under the brand name Flagyl from Searle Laboratories.

The vitamin complex includes folic acid, generally known as Folican and containing the chemical composition of ingredients Pteroylglutamic acid (PGA) or $C_{19}H_{19}N_7O_6$. It is of yellow or yellowish-orange color and is odorless, generally being provided as a crystalline powder. It is very slightly soluble in water. Riboflavin is well known as vitamin B-2, containing the composition $C_{17}H_{20}N_4O_6$. It is also provided in crystalline powder and is of yellow to yellow-orange color, being very slightly soluble in water. Pyridoxine HCl is well known as vitamin B-6 and is of the composition $C_8H_{11}NO_3.HCl$. It is either colorless or of a white color and is provided as crystal or a crystalline powder. It is generally stable in air and slowly affected by sunlight, is sparingly soluble in water. Cyanocobalamin is well known as vitamin B-12 and contains the composition of $C_{63}H_{88}CoN_{14}O_{14}P$. It is generally dark red being provided as hygroscopic crystals or amorphous or crystalline powder. It is also sparingly soluble in water. The last vitamin ingredient, thiamin mononitrate is well known as vitamin B-1 and contains the composition $C_{12}H_7N_5O_4S$. It is usually provided as white crystals or crystalline powder and has a slight odor. It is sparingly soluble in water. All of the vitamins in this vitamin complex have heretofore been used as therapeutic agents in the treatment of specific vitamin deficiencies.

The foregoing preferred product has been tested with various species of fish in connection with numerous types of diseases of both viral and bacterial nature, as well as with numerous parasitic disorders. Although by no means complete, the following are a brief listing of the infectious diseases against which the above mentioned product has been tested and found exceedingly effective:

— Viral Hemorrhagic Septicemia.
— Infectious Abdominal Dropsy
— Bacterial Hemorrhagic Septicemia
— Spot Pests (red sore, pike-pest and red boil disease)
— Ulcer disease (mouth rot, mouth fungus)
— Red pests and General Inflammations
— General infections caused by Brucellacea
— General Septicemia as caused by Aeromonas and Pseudomonas
— Bacterial Gill Disease
— Bacterial Kidney Disease
— Fin and Tail Rot
— Columnaris Disease (mouth fungus and cottonwool disease)
— Infections caused by Mycobacteria (Piscine Tuberculosis)
— Streptomycete infections
— Bacteria in fish egges (Egg White Spot Disease)
— Ulcerative Dermal Necrosis
— General Malaise It has also been found effective against specific susceptible bacteria including the following:

| | |
|---|---|
| Aeromonas: hydrophila, liquefaciens, Punctata, salmonicida | |
| Bacillus: punctatus, rancida | Myxobacteria: spp. |
| Bacterium: punctatum | Pasteruella: pfaffi, spp. |
| Brevibacterium: incertum | Proteus: hydrophilus, morganii |
| Chondrococcus: columnaris | Pseudomonas: cyprinicida, |
| Corynebacterium: spp. | fluorescens, granulata, |
| Cytophaga: columnaris, psychrophila | hirudinis, ichthyodermis, punctata, plehniae, put ida |
| Haemophilus: piscium | Streptomyces: spp. |
| Mycobacterium: spp. | Vibrio: anguillarum, picium, |
| Nocardia: spp. | spp. |

Furthermore, it has also been tested and proven extremely effective against parasitic disorders and against numerous pathogenic species including, but not limited to the following: *Hexamita (Octomitus)* spp., species of the genera Monocercomonas and *Tritrichomonas,* species of the genus Trichomonas, Chilomastix, Giardia & Lamblia spp., *L. denticis,* species of the genera Bodomonas and Cryptobia and Sprionucleus elegans.

Many other parasites of the gastrointestinal tracts gills and blood vessels have also been effectively controlled by this product.

Although a vast number of tests have been carried out using the aforementioned preferred product, as well as other combinations of antibacterial agents, antiparasitic agents, and the vitamin complex, the following tests will be illustrative of the dramatic results obtained when using the combination of ingredients in accordance with the present invention.

TEST 1

Twenty three poolfish of between 3 and 4 ounces each, were divided placing 12 fish in one 20-gallon tank and 11 fish in a second 20-gallon tank. Seven of the fish showed symptoms of severe mouth ulcers: eleven showed symptoms of severe abdominal ulcers and five showed severe intradermal ulcers on their sides. The fish were given an antibacterial agent alone, specifically, oxytetracycline. The dose was provided as an intraperitoneal injection to the fish. The results showed none of the fish cured; ten of the fish died and thirteen continued with the same symptoms.

After waiting between 1 and 2 weeks, the remaining 13 fish were placed in a single 20-gallon tank. The symptoms and observations of the disorders continued to be present. The aforedescribed preferred product was given orally to the fish by adding it to the tank water. The results were that all thirteen fish were cured and no symptoms recurred.

TEST 2

One hundred one-ounce black moor goldfish were placed in a single twenty-gallon tank and another 100 3-ounce blackmoor goldfish were placed in a second 20-gallon tank. All of the fish showed signs of ulcers and external lesions diagnoses as furunculosis, bacterial eye fungus and infestation by *Diplostomum volvens.* A complex of antibacterial agents, specifically nitrofurazone and furazolidone were orally administered to the fish by application to the water. The results showed none of the fish cured, and twenty of the fish dead.

The remaining 180 fish were divided into two 20-gallon tanks, with 90 fish in each tank. This time, a combination of antibacterial agents and vitamin complex drugs were applied. Specifically, the antibacterial agents included a nitrofurazone and furazolidone and the vitamin complex included the preferred vitamin of the present invention. The dose was orally applied by adding it to the water. Prior to administering of the medicine, the symptoms were still present. After application, ten fish were cured, and one additional fish died, providing a 6% cure rate.

The one hundred sixty nine fish still showing symptoms were placed in two 20-gallon tanks with 100 fish in one tank and 69 fish in the other tank. The symptoms still persisted among all the fish. The heretofore described preferred product was orally administered, and the results noted were one hundred sixty four fish completely cured with five additional fish dead, providing a cure rate of 97%.

Although the same fish were reused from one test to another, a period of 1-2 weeks was alowed between specific tests.

TEST 3

A single stock of 60 gold angel fish were divided into three groups of 20 fish each and placed in three different 20-gallon tanks. All of the fish showed a general malaise condition. In the first tank an antibacterial agent and the preferred vitamin complex was applied. Specifically, nitrofurantoin and furazolidone were used as the antibacterial agents together with the preferred vitamin complex. The results showed 17 of the fish cured and 3 died, providing an 85% cure rate.

In the second tank an antiparasitic agent was orally applied, specifically metronidazole. The results were five cured and 15 dead, providing a 20% cure rate.

In the third tank the preferred product of the present invention was orally utilized and the results showed 18 fish cured and two dead, giving a 90% cure rate.

TEST 4

Seventy-five Lemon Tetras, showing no external symptoms, but having some indications indicating an internal parasite present. The fish were placed in a single 20-gallon tank and initially given a combination of antimicrobial agents together with a vitamin complex. Specifically, nitrofurantoin and furazolidone were used as the antimicrobial agents together with the preferred vitamin complex. The results showed no fish cured and fifty of the fish died, thereby providing a zero % cure rate.

Twenty-five of the remaining Lemon Tetras were placed in a single 20-gallon tank and after a period of approximately two weeks they were given the preferred product of the present invention. The results showed all twenty cured with no mortalities thereby giving 100% cure rate.

TEST 5

Ninety Painted Platys were placed in a 50-gallon tank. The fish showed symptoms of closed fins, and fin and tail rot. The fish were given an antibacterial agent, and specifically nitrofuranzone and furazolidone orally applied to the water. The results showed 10 cured and 20 dead, giving an 11% cure rate.

The remaining 60 fish were again placed in a 50-gallon tank, and after a period of approximately 2 weeks, were given the preferred product of the present invention, orally applied to the tank water. The results were all 60 cured, giving 100% cure rate.

TEST 6

Fifty-three Pearl Gouramis were separated into two groups; 30 fish placed in a first 20 gallon tank, and the remaining 23 fish placed in a second 20 gallon tank. All the fish showed symptoms of clouded eyes and some of the fish were lying on their side not swimming at all. In the second tank of 23 fish a combination of antimicrobial agents and a vitamin complex was provided. Specifically, the antimicrobial agent was furazolidone, and the vitamin complex was that of the present invention. Eighteen of the fish were cured, while five died, providing a 78% cure rate. In the tank containing the thirty fish, the preferred product of the present invention was applied and all thirty fish were cured, providing a 100% cure rate.

TEST 7

One 3-ounce black moor goldfish showing split fins, and a clouding of the eye, indicating a parasite, was placed in a single 10-gallon tank and initially given an antiparasitic agent, specifically metronidazole orally applied to the tank water. No observable results were noted.

After waiting approximately 1-2 weeks, the same fish was given a combination of an antiparasitic agent and a vitamin complex, specifically metronidazole and the preferred vitamin complex of the present invention. The split fin cleared up but the remaining illness was still readily apparent.

After waiting a further period of approximately 1-2 weeks the same fish was given the preferred product of the present invention, and the results showed a 100% cure of the fish.

TEST 8

One 5-ounce redcap goldfish and one 2-ounce discus were placed in individual 10-gallon tanks. The fish showed apparent bacterial hemorrhagic septicemia, and specifically the redcap had exothalmus with blood covering the cornea and the discus had fin and tail rot. The fish were given an antibacterial agent alone, specifically nifurpirinol. None of the fish were cured and the disease continued.

The same fish, were now given the preferred product in accordance with the present invention and both fish were cured, providing a 100% cure rate.

While these are but a few of the numerous tests carried out, it appears evident that the combination of the antibacterial agents, the chemically compatible antiparasitic agent, and the chemically compatible vitamin complex, provides unusual results, and specifically the preferred product heretofore described has been found to give most extraordinary results. These results can generally be noted within three days after application. However, the medicine can be continued for longer periods of time without harming the fish. Furthermore, the product of the present invention has been found to be a prophylaxis, giving excellent maintanence therapy in maintaining the environmental stress at a minimum and preventing the fish from contacting various disorders. While the aforedescribed tests showed the product applied orally, it can also be applied directly to the fish by means of an intraperitoneal injection. For use as an injecting drug there would necessarily be added various vehicles, such as emulsfying agents, preserving agents, etc., as Propylene Glycol, as is well known in the art. When providing medicine orally, the various ingredients can be compressed together as a tablet or as a capsule or formed as a liquid to be added directly to the water. It can be used either in holding tanks or in fisheries and can be used either by hobbyists, retailers, wholesalers, or industrial users. In addition to providing a cure, it can also be used as a prophylaxis for preparing tanks to accept fish or when foreign fish are introduced into an existing tank to insure against any occurring disease, or as a general tonic to maintain the good health of the fish.

The antimicrobial agent and the antiparasitic agent, must of course be chemically compatible with each other. Various chemical incompatibilities are well known in the art and are discussed by way of example in Remington's Pharmaceutical Sciences, Mack Publishing Co., 15th Edition, 1975.

The product of the present invention has been found to provide a broad spectrum of antibacterial action plus antiparasitical action for an even broader attack and wider range than heretofore obtainable. The vitamin supplement is incorporated and helps remove adverse environmental stress. When applying the product of the present invention there was found no need to discontinus filtration, no need to remove the carbon filter and no need to increase aeration.

Furthermore, there was no need to change water after treatment, nor was there any need to raise the tank water temperature during its use. Since there is no salt in the present compound, the drug can be used together with all species of fish. Also, since it is compatible with salt, salt can be added to the fish tank as desired. The drug of the present invention provides excellent use when no specific pathogen has been identified or diagnosed, and when it is necessary to combat a wide variety of bacterial and parasitic diseases. It can also be used with generally all types of fish. Furthermore, it was found that the present medicine was safe even at 800% overdose so that there need be no overdose worries in applying too much of the medicine to the water. The product of the present invention was also found to produce superior medicating of tanks having overtaxed equilibriums by overcrowding in a tank.

There has been disclosed heretofore the best embodiments of the invention presently contemplated. However, it is to be understood that various changes and modifications may be made thereto without departing from the spirit of the invention.

What is claimed is:

1. A medical product for use in preventing and curing diseases in fish, comprising effective amounts an antimicrobial agent, a chemically compatible antiparasitic agent and a chemically compatible vitamin complex.

2. The product of claim 1 and wherein said antimicrobial agent is selected from the group consisting of nitrofurans, aminoglycocides, tetracyclines, metabolic antimicrobials and synethetic antibiotics.

3. The product of claim 1 and wherein said antiparasitic agent is metronidazole.

4. The product of claim 1 and wherein said vitamin complex consists of folic acid, riboflavin, pyridoxine HCl, cyanocobalamin, and thiamin mononitrate.

5. The product of claim 2 and wherein said antimicrobial agents contains nitrofurantoin and furazolidone.

6. The product of claim 1 and wherein said antinicborial agent further comprises a combination of chemically compatible individual antimicrobial agents.

7. The product of claim 1 and wherein said antimicrobial agent contains nitrofurantoin and furazolidone; said antiparasitic agent contains metronidazole; and said vitamin complex contains folic acid, riboflavin, pyridoxine HCl, cyanocobalamin, and thiamin mononitrate.

8. The product of claim 1 and wherein the percent compositions by weight of the contents are approximately,

| | | | |
|---|---|---|---|
| nitrofurantoin | 6.1% | pyridoxine HCl | 12.18% |
| furazolidone | 12.2% | cyanocobalamin | 0.006% |
| metronidazole | 60.9% | riboflavin | 2.44% |
| folic acid | 0.12% | thiamin mononitrate | 6.09% |

9. The product of claim 1 and further containing vehicles for making said product injectable.

10. The product of claim 9 and wherein said vehicles include emulsfying agents and preserving agents.

11. A method for preventing and curing disease in fish, comprising the steps of:
 a. introducing in effective amounts into the subjects and antimicrobial agent;
 simultaneously introducing into the subjects a chemically compatible antiparasitic agent; and
 c. simultaneously introducing into the subjects a chemically compatible vitamin complex.

12. A method as in claim 11 and wherein said antimicrobial agent comprising nitrofurantoin and furazolidone, said antiparasitic agent comprises metronidazole and said vitamin complex comprises folic acid, riboflavin, pyridoxine HCl, cyanocobalamin, and thiamin mononitrate.

* * * * *

UNITED STATES PATENT AND TRADEMARK OFFICE
CERTIFICATE OF CORRECTION

PATENT NO. : 4,053,593
DATED : October 11, 1977
INVENTOR(S) : Lew Frumoff

It is certified that error appears in the above-identified patent and that said Letters Patent are hereby corrected as shown below:

In the Title, change "Antiporasitic" to --Antiparasitic--

Column 1, line 27: change "interanl" to --internal--
Column 1, line 37, change "ect." to --etc.--

Column 3, line 44: change "EMBODIMENT" to --EMBODIMENTS--

Column 5, line 5: change "malachitegreen" to --malachite green--
Column 5, line 66: after "utilized" add --for-- and after "above" place a comma.

Column 6, line 9: change "Aeroabcter" to --Aerobacter--
Column 6, line 18: change "to" first occurrence to --on--
Column 6, line 59: change the formula to read --$C_{12}H_{17}N_5O_4S$--

Column 7, line 35: change "put ida" to --putida--
Column 7, line 48: after "tracts" place a comma Column 8, line 16: change "diagnoses" to --diagnosed--
Column 8, line 42: change "alowed" to --allowed--

Column 10, line 17: change "contacting" to --contracting--
Column 10, lines 47 and 48: change "discontinus" to --discontinue--.

Claim 1, line 2: after "amount" add --of--

UNITED STATES PATENT AND TRADEMARK OFFICE
CERTIFICATE OF CORRECTION

PATENT NO. : 4,053,593
DATED : October 11, 1977
INVENTOR(S) : Lew Frumoff

It is certified that error appears in the above-identified patent and that said Letters Patent are hereby corrected as shown below:

Claim 6, lines 1 and 2, change "antinicborial" to --antimicrobial--

Claim 11, line 4: change "and" to --an

Claim 11, line 5: at the beginning of the line add --b.--

Signed and Sealed this

Eleventh Day of April 1978

[SEAL]

Attest:

RUTH C. MASON
Attesting Officer

LUTRELLE F. PARKER
Acting Commissioner of Patents and Trademarks